Nov. 1, 1966
W. BOCK ETAL
3,282,224
MEMBRANE OR PISTON PUMP
Filed Nov. 30, 1964
2 Sheets-Sheet 1
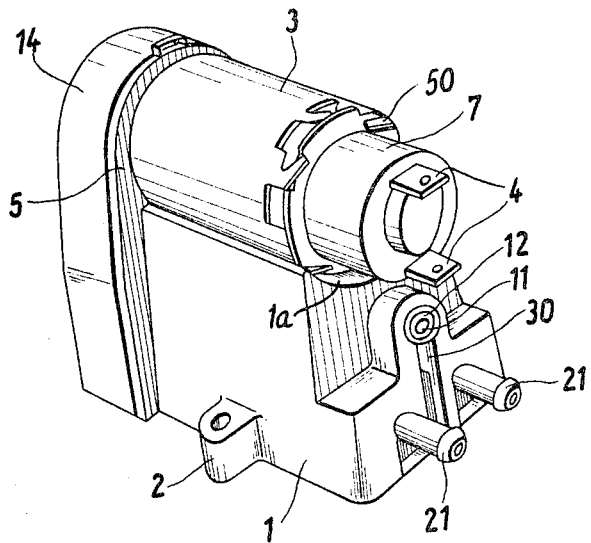
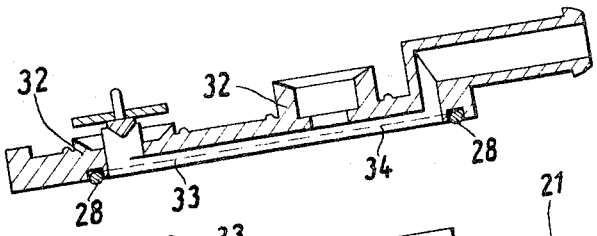
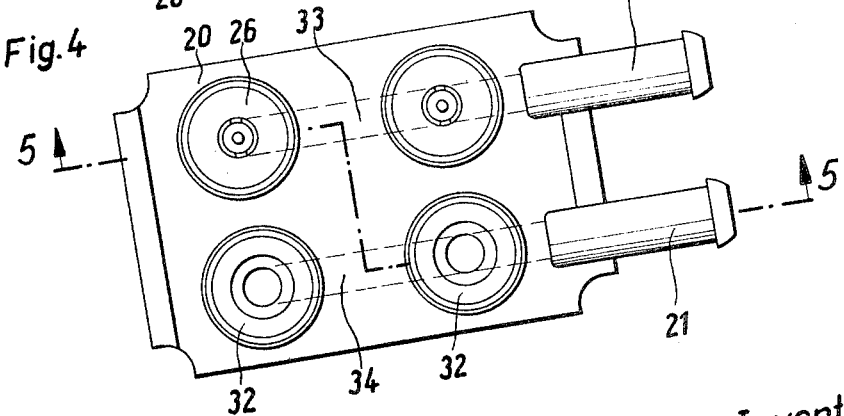
Inventors
WILLY BOCK
ERICH MUTSCH United States Patent Office 3,282,224
Patented Nov. 1, 1966

3,282,224
MEMBRANE OR PISTON PUMP
Willy Bock and Erich Mutschler, Bietigheim, Wurttemberg, Germany, assignors to SWF-Spezialfabrik fur Autozubehor Gustav Rau G.m.b.H., Bietigheim, Wurttemberg, Germany
Filed Nov. 30, 1964, Ser. No. 414,791
Claims priority, application Germany, Dec. 12, 1963, S 88,679
4 Claims. (Cl. 103—152)

This invention relates in general to pump construction and in particular to a new and useful piston or membrane pump particularly for use for spraying windshields of motor vehicles and to an inexpensive and simple pump construction which is opened at one end for receiving reciprocating pump piston parts and associated valves and is provided with a mounting on an opposite end for a driving electric motor with the side thereof provided with a removable cover for access to a driving gear secured to the motor and a driven gear secured to the shaft operating the pistons.

The invention particularly relates to a membrane or piston pump which is operated from a high speed small size electric motor and which preferably has more than one pump chamber in which is reciprocable a piston. A pump of this type is particularly applicable for windshield sprinkler systems of motor vehicles and may be employed for conveying washing fluid from a storage tank to the windshield, for example. Previously known membrane or piston pumps of small capacity particularly those used for windshield sprinkler systems included only one pumping chamber. A disadvantage of such a pump is that the medium to be conveyed is discharged in spurts. During the suction stroke of the membrane, the pressure valve remains closed. The movement of the washing fluid therefore is discharged in the form of a pulsating current. For a windshield sprinkler such a pulsating delivery is particularly disadvantageous because despite relatively high motor speed, the washing fluids will issue at the nozzle in individual droplets and thereby a fog-like wide jet is formed which can be easily deflected by headwind or side wind. In some instances, these pressure pulses are absorbed by the rubber or plastic hoses so that the discharge pressure is greatly reduced and little or no washing fluid gets to the windshield. With a one-chamber pump it will be practically impossible to eliminate this disadvantage, because as the generated maximum pressure of the pump will never become fully effective, but only, at best, an arithmetic mean of the individual pressure pulses will be generated. Because of these defects the membrane pump becomes uneconomical and in some cases even useless despite its known advantages of insensitivity and noiseless operation.

In an attempt to overcome the above disadvantage, a multi-chamber pump is already known which is designed as a swash plate piston pump. In such a construction, several pump chambers are distributed over a circular circumference and a compression stroke of the piston is produced by a swash plate which forms one piece with the drive shaft and which slides on the pumping housing by a surface normal to the shaft. Such pumps, however, have not been accepted in practice because they must be made of precision parts and are very expensive and due to frictional losses have an extremely low efficiency. Also known is a membrane pump having two opposite pump chambers which are moved with an eccentric drive, the drive of the pump being derived from the drive train of the tachometer. This pump has also found no acceptance in practice because the derivation of the drive from the tachometer is unfavorable and further because a suction and a pressure connection must be provided for each pump chamber. In addition, the construction of this pump for windshield sprinkler systems is relatively complicated and expensive.

An object of the present invention is to provide a membrane or piston type pump having approximately uniform feed pressure which pressure comes as close as possible to the maximum pressure in the pump chamber and which pump advantageously uses a commercial high speed small size electric motor as the drive.

A further requirement of the invention is that the pumps have as high an efficiency as possible and the greatest possible compactness due to their incorporation in relatively small size automobiles adjacent the instrument panel and in addition it should be simple and inexpensive to manufacture.

In accordance with a preferred arrangement of the invention, there is provided a pump which includes a housing which, for example, may be molded of inexpensive plastic material and which is provided with a piston chamber which opens at one end. The open end is provided with slots which extend up to enlarged bearing openings for receiving bushings for rotatably supporting the piston shaft. The construction permits the eccentrics for driving the pistons to be mounted on the shaft after they are located within the piston elements with which they are designed to reciprocate, and the whole assembly along with the associated valving mechanism to be mounted on a cover plate for the chamber for insertion into the chamber as a unit.

In accordance with a further feature of the invention, the housing is formed with an extending side or top wall on which is mounted a driving electric motor in a manner such that its driving shaft projects outwardly through the opposite side of the wall. The opposite side of the wall also provides a mounting for the shaft for the pump pistons and the driving gears are arranged on the piston shaft and the motor shaft on the exterior of the housing wall. The construction is such that a simple snap on cover may be provided to completely enclose the gearings after the parts are assembled in a simple manner. The snap on covering may also be molded or formed with suitable name plates and this again simplifies the production of the device.

A further feature of the invention is that a small size electric motor may be arranged on the carrier housing and its shaft arranged parallel to the piston shaft so that the driving gears may simply and easily be connected to the respective shafts. The gears are advantageously made of a plastic material so that they provide an impact damping force transmitting means. Of course, instead of gears friction wheels or a cable belt drive may be employed. The side of the gears are preferably so arranged that in accordance with the number of pump chambers provided there occurs a reduction of the motor speed to the speed of the piston rod shaft, that is, with two pump chambers a reduction of the piston rod shaft speed to half the motor shaft speed and with three piston chambers a reduction to one-third the motor speed.

A further feature of the invention is that the pistons are driven by eccentrics which may be easily slipped over an end of a squared shaft in accordance with the number of pump chambers employed. The eccentrics may be rotated to change the angular offset between one eccentric and another in order to insure that the torque delivered from the motor remains almost constant in the operation of the pump. By arranging the driving motor shaft and the piston shaft so that they are parallel a relatively simple construction is obtained permitting access to all of the parts and the drive is such that a much longer life of the pump, especially the motor will be effected. The transmission is advantageously effected through plastic gearing with a speed reduction so that the piston rod shaft which is subjected to impact or shock due to the pumping action of the pistons will rotate at a much smaller speed than the motor and such shocks will not be transmitted to the motor shaft which rotates at high speeds (for example, about 3000 r.p.m.). A particularly favorable arrangement is a pump employing three pump chambers. The pump chambers advantageously are arranged in a row spaced axially along the piston shaft.

Accordingly it is an object of the invention to provide improved pump construction.

A further object of the invention is to provide a pump particularly adaptable for use in windshield sprinkler systems which includes a housing having a pumping chamber defined beneath a support for an electric driving motor which pumping chamber is opened at one end and which is slotted inwardly on each side from the open end to permit assembly of the piston driving shaft, pistons, and valve assemblies, all of which are mounted on a cover plate which closes the pump chamber and which further includes a side wall through which the piston shaft and the motor shaft extend permitting assembly of the driving gears between the motor and piston shaft on the exterior of the housing wall.

A further object of the invention is to provide an inexpensive pump in which the parts may be easily assembled into a pump housing and which further includes means for mounting the shafts of a driving motor and a pump piston parallel so that they may be driven through gearing of a selected gearing ratio and advantageously of gearing which will not distribute the impact forces from the piston shaft to the driving motor.

A further object of the invention is to provide a pump construction which includes a pumping chamber defined in a housing opened at one end, which housing is adapted to receive a complete pumping assembly including a piston shaft carrying a plurality of eccentrics for driving respective piston elements and separate inlet and outlet valve means all of which may be mounted on a plate which is adapted to be placed to close the housing and position the operating parts therein.

A further object of the invention is to provide a pump which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a perspective view of a pump constructed in accordance with the invention;

FIG. 4 is a top plan view of the lower valve receiving plate; and

FIG. 5 is a section taken on the line 5—5 of FIG. 4.

Figure 2:
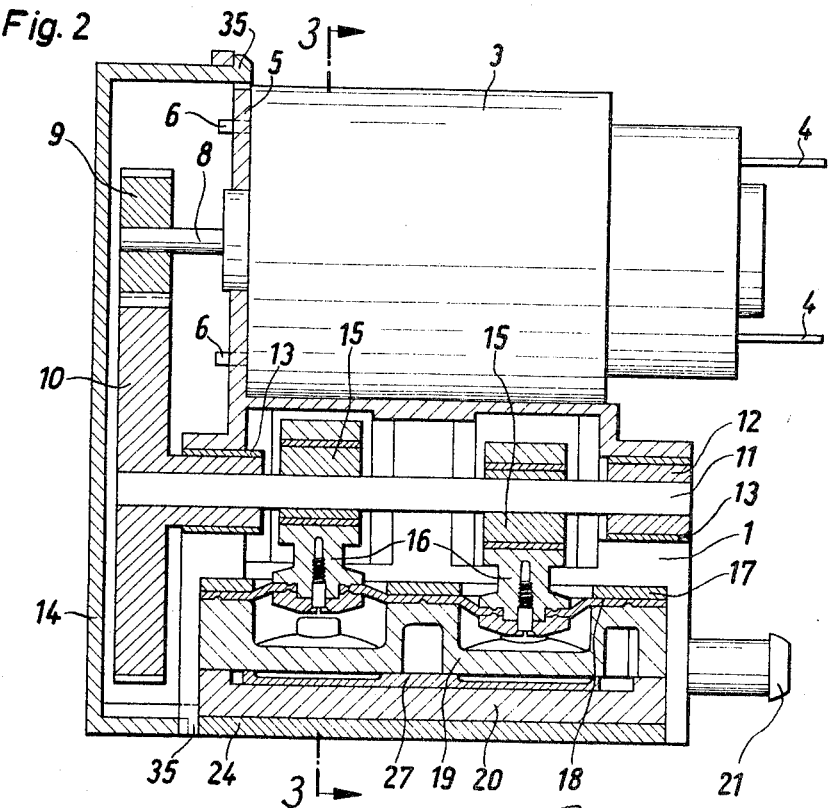
FIG. 2 is a longitudinal section through the pump indicated in FIG. 1 with the motor being shown in side elevation.
Figure 3:
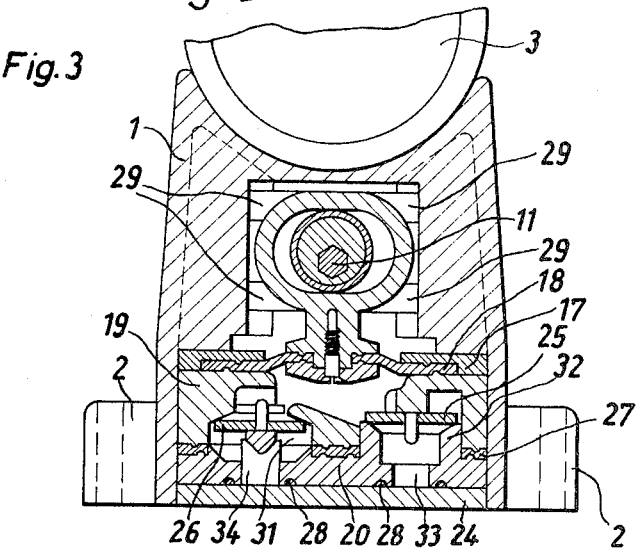
FIG. 3 is a section taken on the line 3—3 of FIG. 2.

Referring to the drawings in particular, the invention embodied therein comprises a two chamber membrane pump which includes a carrier housing generally designated 1 having attachment lugs 2 and having a curved top wall 1a which forms a mounting base for supporting a high speed small size electric motor 3. The electric motor 3 is provided with extensions 6 which fit into openings of an end wall 5 defined as an extension of the housing 1. The motor includes a hood portion 7 which is secured to the main portion by engaging elements 50 and which includes electrical connections or contacts 4. The contacts 4 are formed as flat plug-in contact elements to permit the pump 1 to be easily inserted in an electrical circuit such as on an instrument board of an automobile.

The motor 3 includes driving shaft 8 which extends through the end wall 5 and carries a driving gear 9 which meshes with a driven gear 10 which is carried on a piston shaft 11 for rotation therewith. In the embodiment illustrated, the piston rod shaft 11 is a hexagonal rod and the gear 10 is a plastic gear which may be easily slipped over the piston rod shaft 11 and frictionally secured therewith. A bearing bushing 12 may also be made of plastic material and is slipped on the opposite end of the piston rod shaft 11 in a similar manner.

Brass sleeves 13, 13 are fitted into cylindrical openings defined at each end of the housing 1 and provide means for improving the rotation of the hub of the gear 10 and the bearing bushings 12. A feature of the construction is that the gears 9 and 10 are located outside of the end wall 5 of the housing 1 and are easily accessible for adjustment and/or replacement. The gears are covered during operation of the pump by a cover such as a plastic cap 14 having extensions 35 which engage in cutouts in the end wall 5.

A further feature of the invention is that the carrier housing 1 is hollow and defines a pumping chamber which is opened at the bottom and is provided with end walls having slots 30, 30 which extend from the open end wall upwardly to a cylindrical recess defined as a bearing for the bushing 12 and the hub of the gear 10, respectively. Because of these slots 30 it is possible to assemble a piston rod shaft 11 with the piston rods 16 which are first mounted on eccentrics 15 which are slid over the shaft 11.

A complete assembly of the operating parts of the pump is made over an end plate or cover 24 on which is assembled a membrane receiving plate 17, a membrane 18 and valve carrying parts 19 and 20 forming the pump chambers. These elements are advantageously assembled outside of the carrier housing or pumping chamber as a single structural unit and then the whole unit is inserted into the carrier housing 1.

The valve carrying part 20 which is indicated in particular in FIGS. 4 and 5 comprises a plate element having tubular extensions 21, 21 at one end which communicate with interior passages and form exterior hose connections. A suction passage 33 communicates with one hose connection and a compression or discharge passage 34 communicates with the other hose connection. The passages are made parallel for simplicity and manufacturing purposes and are closed by the cover plate 24. In order that the hose connections may be made in a simple manner the hose connection tube elements 21, 21 are all set upwardly from the major portion of the valve plate 20 to provide free space for inserting or removing the hoses. Valves 25 and 26 are made of soft elastic rubber or plastic material and advantageously operate in a manner of a clack valve. The valve discs 26 located in the discharge passage are fastened on the valve receiving plate 20 and corresponding cutouts 31 are made in the plate 20 to serve as a valve seat. The valve discs 25 are arranged in a suction passage and are fastened to the valve receiving plate 19 where a corresponding lug 32 on the receiving plate 20 serves as a valve seat. The two receiving plates 19 and 20 are sealed from each other by a rubber plate 27. The suction and compression channels in the valve receiving plate 20 are sealed from the bottom plate 24 by endless rubber cords 28 which surround them.

In order that the piston rods 16 which are designed as plastic molded parts will be operated in an up and down reciprocating movement only, there are arranged lateral extensions 29 thereon which slide back and forth in contact with the substantially vertical side walls and limit the piston to the up and down movement.

The covering cap 14 may be simply and inexpensively molded and may be arranged to carry the name plate, type designation and technical data in respect to the pump, if necessary. It is a simple manner to provide this data on the plastic cap 14 rather than on the bottom plate 24, or other part since it may be engraved, when the part is formed, or may be applied with a stamp. In addition, the data may be easily removed if the pump designation or other characteristics thereof are changed.

While a specific embodiment of the invention has been shown and described in detail to illustrate the application of the inventive principles, it will be understood that the invention may be embodied otherwise without departing from such principles.

What is claimed is:

1. A pump comprising a housing defining a pump chamber therein and having an opening with a side wall on each side of the opening, said housing having an exterior surface defining a mounting for a driving motor, said housing having a bearing wall adjacent said mounting with a first opening for the driving motor shaft and a second opening extending into the pump chamber for the pump shaft, a pump shaft rotatably mounted in said pump chamber and extending through the second opening, piston means connected to said pump shaft for actuation by rotation of said pump shaft, said chamber having passage and valve means for taking in and discharging fluid in response to the rotation of said shaft, an electric driving motor mounted on said housing on said motor mounting with its shaft extending through said first opening and arranged substantially parallel to said pump shaft, said pump shaft being connected exteriorly of said bearing wall by impact and shock dampening force transmitting means, a cover plate closing the opening of said pump chamber; said pump shaft, said piston means, and said passage and valve means being mounted on said cover and positioned in said pump chamber when said cover closes the opening of said pump chamber.

2. A pump comprising a housing defining a pump chamber therein and having an opening at one end and an end wall at the opposite end defining an exterior mounting for an electric driving motor, said housing having a side wall on each side of the opening each having a slot extending from the opening inwardly and terminating in an enlarged bearing boss, one of said side walls being extended from said pumping chamber adjacent said motor mounting and having a first opening for permitting the motor shaft to extend therethrough and a pump assembly including a pump shaft of a length greater than the distance between said side walls insertable into said pumping chamber from the opening at one end of said chamber upwardly along said slots, said pump shaft extending outwardly from the side wall having said first opening and being in spaced parallel relationship to said electric motor shaft, a plurality of eccentrics carried on said shaft within said pumping chamber, a piston member associated with each of said eccentrics and being reciprocable upon rotation of said eccentric, said pumping chamber having passage and valve means for taking in and discharging fluid in response to reciprocation of said pistons, and driving gears affixed to said pump shaft and said electric motor shaft on the exterior of said side wall, a plate member closing the opening of said pumping chamber; said pump shaft, said eccentrics and said pistons with said passage and valve means being mounted on said plate.

3. A pump comprising a housing defining a pump chamber therein and having an opening at one end and an end wall at the opposite end and defining an exterior mounting for an electric driving motor, said housing having a side wall on each side of the opening each having a slot extending from the opening inwardly and terminating in an enlarged bearing boss, one of said side walls being extended from said pumping chamber adjacent said motor mounting and having a first opening for permitting the motor shaft to extend therethrough and a pump assembly including a pump shaft of a length greater than the distance between said side walls insertable into said pumping chamber from the opening at one end of said chamber upwardly along said slots, said pump shaft extending outwardly from the side wall having said first opening and being in spaced parallel relationship to said electric motor shaft, a plurality of eccentrics carried on said shaft within said pumping chamber, a piston member associated with each of said eccentrics and being reciprocable upon rotation of said eccentric, said pumping chamber having passage and valve means for taking in and discharging fluid in response to reciprocation of said pistons, and driving gears affixed to said pump shaft and said electric motor shaft on the exterior of said side wall, a plate member closing the opening of said pumping chamber, said pump shaft, said eccentrics and said pistons with said passage and valve means being mounted on said plate, said passage and valve means including a plate member having an inlet and a discharge passage defined thereon and each terminating in a tubular extension, one of said side walls of said housing having spaced second slots extending inwardly from said opening, said tubular extensions of said plate member extending through respective slots.

4. A pump comprising a housing defining a pump chamber therein and having an opening at one end and an end wall at the opposite end and defining an exterior mounting for an electric driving motor, said housing having a side wall on each side of the opening each having a slot extending from the opening inwardly and terminating in an enlarged bearing boss, one of said side walls being extended from said pumping chamber adjacent said motor mounting and having a first opening for permitting the motor shaft to extend therethrough and a pump assembly including a pump shaft of a length greater than the distance between said side walls insertable into said pumping chamber from the opening at one end of said chamber upwardly along said slots, said pump shaft extending outwardly from the side wall having said first opening and being in spaced parallel relationship to said electric motor shaft, a plurality of eccentrics carried on said shaft within said pumping chamber, a piston member associated with each of said eccentrics and being reciprocable upon rotation of said eccentric, said pumping chamber having passage and valve means for taking in and discharging fluid in response to reciprocation of said pistons, and driving gears affixed to said pump shaft and said electric motor shaft on the exterior of said side wall, a plate member closing the opening of said pumping chamber, said pump shaft, said eccentrics and said pistons with said passage and valve means being mounted on said plate, said pistons surrounding said eccentrics and being driven thereby, a membrane connected to each of said pistons and being flexed in accordance therewith, said passage and valve means including a passage associated with each membrane which is actuated by a respective piston.

References Cited by the Examiner

UNITED STATES PATENTS

| 861,488 | 7/1907 | Waters | 103—57 X |
| 862,867 | 8/1907 | Eggleston | 230—50 |
| 2,650,545 | 9/1953 | Cornelius | 103—152 X |
| 3,059,586 | 10/1962 | Brailsford | 103—216 X |

ROBERT M. WALKER, *Primary Examiner.*